(12) United States Patent
Wang et al.

(10) Patent No.: US 10,816,752 B2
(45) Date of Patent: Oct. 27, 2020

(54) VIRTUAL REALITY HELMET AND CONTROL METHOD THEREOF

(71) Applicant: BOE TECHNOLOGY GROUP CO., LTD., Beijing (CN)

(72) Inventors: Xin Wang, Beijing (CN); Lin Zhou, Beijing (CN); Fan Yang, Beijing (CN); Jianhua Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 185 days.

(21) Appl. No.: 15/918,543

(22) Filed: Mar. 12, 2018

(65) Prior Publication Data

US 2019/0094486 A1 Mar. 28, 2019

(30) Foreign Application Priority Data

Sep. 25, 2017 (CN) .................. 2017 2 1237253 U

(51) Int. Cl.
| | |
|---|---|
| *G02B 7/09* | (2006.01) |
| *G06F 1/16* | (2006.01) |
| *G02B 7/06* | (2006.01) |
| *G02B 27/00* | (2006.01) |

(52) U.S. Cl.
CPC ................. *G02B 7/09* (2013.01); *G02B 7/06* (2013.01); *G02B 27/0093* (2013.01); *G06F 1/163* (2013.01)

(58) Field of Classification Search
CPC ............ G02B 27/0093; G02B 27/0172; G02B 27/0176; G02B 7/06; G02B 7/09; G02B 2027/0181; G02B 27/00; G02B 27/01; G06F 1/163; G06F 1/16
See application file for complete search history.

(56) References Cited

U.S. PATENT DOCUMENTS

| | | | | |
|---|---|---|---|---|
| 5,872,590 | A * | 2/1999 | Aritake .................. | H04N 13/31 348/57 |
| 2007/0171524 | A1* | 7/2007 | Steinthal ................. | G02B 7/06 359/466 |
| 2012/0147038 | A1* | 6/2012 | Perez ................. | G02B 27/0172 345/632 |
| 2014/0153102 | A1* | 6/2014 | Chang ................ | G02B 27/0172 359/630 |
| 2015/0138048 | A1* | 5/2015 | Park .................... | G02B 27/0172 345/8 |

(Continued)

FOREIGN PATENT DOCUMENTS

| | | |
|---|---|---|
| CN | 204065558 A | 12/2014 |
| CN | 105259658 A | 1/2016 |

(Continued)

*Primary Examiner* — Balram T Parbadia
(74) *Attorney, Agent, or Firm* — Dinsmore & Shohl LLP

(57) ABSTRACT

The present disclosure relates to a virtual reality helmet and a control method. The virtual reality helmet includes an optical lens group including lenses that include at least two optical lenses arranged along a direction of an optical axis of the lenses; and a lens distance adjusting module configured to automatically adjust a distance of at least one of the lenses relative to a display screen along the direction of the optical axis of the lenses so that a focal length of the optical lens group is adapted to the diopter of a helmet wearer.

18 Claims, 4 Drawing Sheets

(56) References Cited

U.S. PATENT DOCUMENTS

| | | | | |
|---|---|---|---|---|
| 2015/0187115 A1* | 7/2015 | MacDonald | ............ | G06F 3/013 345/419 |
| 2016/0195728 A1* | 7/2016 | Choi | ..................... | G02B 30/37 359/480 |
| 2016/0270656 A1* | 9/2016 | Samec | .................... | A61B 3/022 |
| 2017/0205877 A1* | 7/2017 | Qin | ................... | G02B 27/0172 |
| 2018/0003919 A1* | 1/2018 | Song | ........................ | G02B 7/08 |
| 2018/0088333 A1* | 3/2018 | Li | ............................ | G02B 5/30 |
| 2018/0146188 A1* | 5/2018 | Simmonds | ......... | G02B 27/0172 |

FOREIGN PATENT DOCUMENTS

| | | |
|---|---|---|
| CN | 106646872 A | 5/2017 |
| CN | 106970468 A | 7/2017 |

\* cited by examiner

VIRTUAL REALITY HELMET AND CONTROL METHOD THEREOF

CROSS-REFERENCE TO RELATED APPLICATIONS

This application claims the priority from Chinese Patent Application No. 201721237253.6, filed on Sep. 25, 2017, the contents of which are hereby incorporated by reference in their entirety.

TECHNICAL FIELD

The present disclosure relates to a virtual reality helmet and control method thereof.

BACKGROUND

With the development of Virtual Reality (VR) technology, various application facilities of VR have gradually come into people's lives. In the specific application of VR technology, the VR helmet that can be worn on human's head is welcomed because it enables people to experience games or view videos as if they were personally on the scene.

In the related art, the VR helmet is provided therein with a lens and a display screen. People can view images on the display screen through the lens. However, unclear image viewing may occur when people are wearing the VR helmet due to mismatch between their eyesight and a focal length of the lens in the VR helmet.

SUMMARY

In view of this, a VR helmet and control method thereof are provided in embodiments of the present disclosure, which can improve the use experience of helmet wearers with different eyesight.

According to an aspect of the present disclosure, a VR helmet is provided, comprising: an optical lens group including lenses that comprise at least two optical lenses arranged along a direction of an optical axis of the lenses; and a lens distance adjusting module configured to automatically adjust a distance of at least one of the lenses relative to a display screen along the direction of the optical axis of the lenses, so that a focal length of the optical lens group is adapted to a diopter of a helmet wearer.

According to an aspect of the present disclosure, a control method based on the aforementioned VR helmet is provided, comprising: acquiring the diopter of the VR helmet wearer; automatically adjusting a distance of at least one optical lens in an optical lens group relative to the display screen along a direction of an optical axis of the lenses so that the focal length of the optical lens group is adapted to the diopter of the helmet wearer.

According to an aspect of the present disclosure, a VR helmet is provided, comprising: a memory; and a processor coupled to the memory, the processor being configured to execute aforementioned the control method based on instructions stored in the memory.

According to an aspect of the present disclosure, there is provided a computer-readable storage medium storing a computer program which, when executed by a processor, implements aforementioned the control method.

BRIEF DESCRIPTION OF THE DRAWINGS

Drawings explained here are used to provide further understanding of the present disclosure, which constitute a portion of the present application. The schematic embodiments and description thereof of the present disclosure are used for explaining the present disclosure, and do not constitute improper delimitations of the present disclosure.

In the drawings.

DETAILED DESCRIPTION

Figure 1:
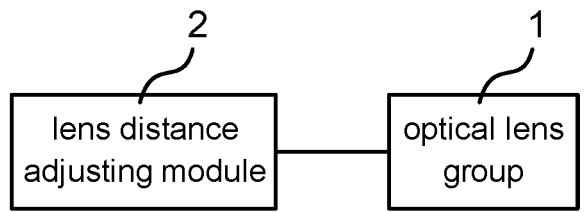
FIG. 1 is a schematic structure view of a VR helmet in some embodiments of the present disclosure.

The technical solutions in the embodiments of the present disclosure will be described clearly and completely with reference to the accompanying drawings. Referring to the non-limiting exemplary embodiments shown in the accompanying drawings and to be described in detail in the following description, exemplary embodiments of the present disclosure and their various features and advantageous details are described more fully. It should be noted that the features shown in the figures are not necessarily to scale. This disclosure has omitted descriptions of well-known materials, assemblies, and process technologies so as not to obscure the exemplary embodiments of the present disclosure. The examples presented are merely intended to facilitate an understanding of implementation of the exemplary embodiments in the present disclosure and to further enable those skilled in the art to implement the exemplary embodiments. Therefore, these examples should not be construed as limiting the scope of the embodiments of the present disclosure.

Unless otherwise particularly defined, the technical terms or scientific terms used in the present disclosure should be in an ordinary sense understood by those having ordinary skills in the art to which the present disclosure pertains. The wording "first", "second", or the like used in the present disclosure do not denote any order, quantity or importance, but merely serve to distinguish different constituent parts. In addition, in the embodiments of the present disclosure, the same or similar reference numerals denote the same or similar components.

The inventor has found through research that: the reason why people cannot view images clearly when wearing the VR helmet, is mainly that the distance between the lens and the display screen in the VR helmet in the related art is relatively fixed and the focal length of the lens is not adjustable. Thus, the images projected from the display screen onto the retinas of the helmet wearers with different eyesight may be obscure. As a result, these people tend to feel uncomfortable and lack immersion during the viewing process.

In order to improve the use experience of the helmet wearers with different eyesight and meet their use requirements, a VR helmet is provided in embodiments of the present disclosure, which can improve the use experience of helmet wearers with different eyesight.

FIG. 1 shows a schematic structure view of a VR helmet in some embodiments of the present disclosure.

In FIG. 1, the VR helmet comprises: an optical lens group 1 including at least two optical lenses arranged along a direction of an optical axis of the lenses; and a lens distance adjusting module 2 for automatically adjusting a distance of at least one of the optical lenses relative to a display screen along the direction of the optical axis of the lenses so that a focal length of the optical lens group 1 is adapted to a diopter of a helmet wearer.

According to the embodiments of the present disclosure, by automatically adjusting the distance of the optical lens relative to the display screen along the direction of the optical axis of the lenses using the lens distance adjusting module, the focal length of the optical lens group can be automatically adjusted to adapt to the diopter of the helmet wearer, so that the helmet wearers with different eyesight can view the display screen more clearly, effectively improving the use experiences of the helmet wearers with different eyesight.

Figure 2:
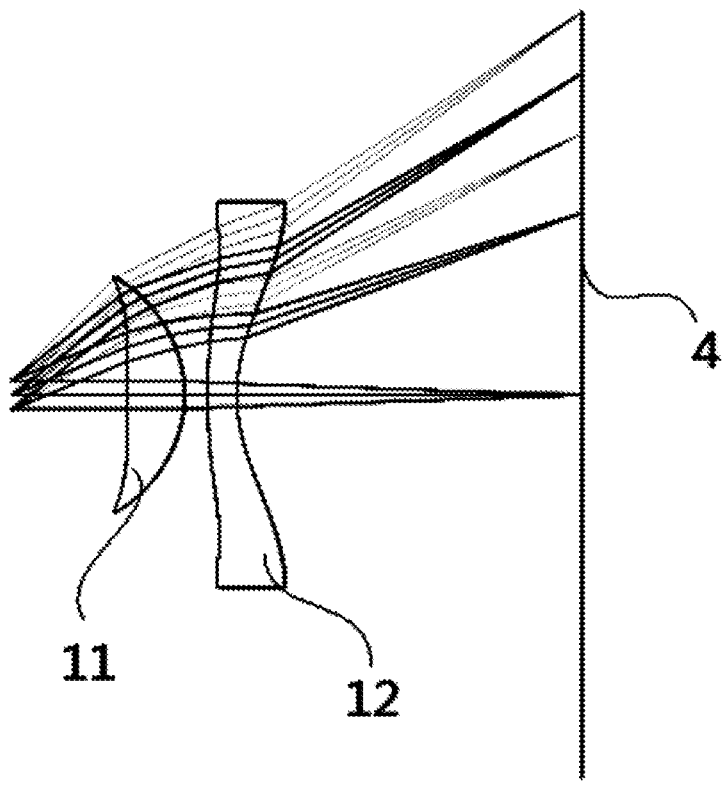
FIG. 2 is a schematic light path view of an optical lens group of the VR helmet in the embodiments of the present disclosure.

FIG. 2 shows a schematic light path view of the optical lens group of the VR helmet in the embodiments of the present disclosure.

Figure 5:
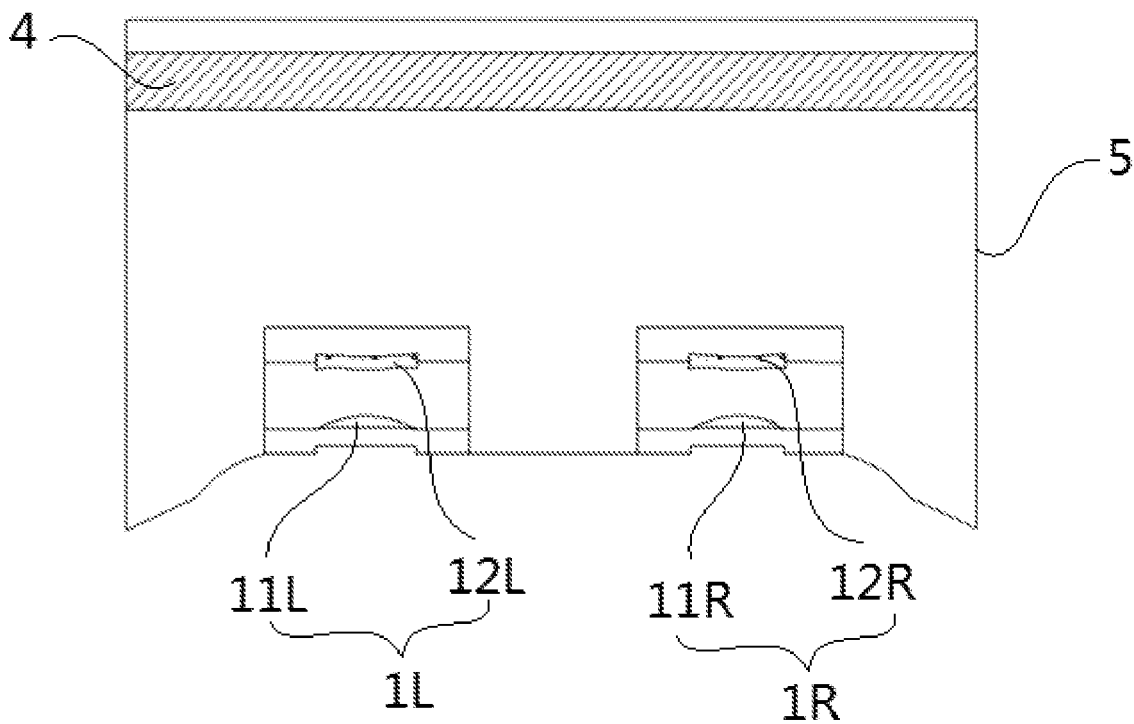
FIG. 5 is a schematic structure view of a left eye lens group and a right eye lens group of the VR helmet in the embodiments of the present disclosure.

In FIG. 2, the optical lens group 1 comprises a first optical lens 11 near the helmet wearer's eyeball side and a second optical lens 12 near the display screen 4 side (refer to FIG. 5). When the lens distance adjusting module 2 adjusts the distance of the first optical lens 11 and/or the second optical lens 12 relative to the display screen 4 along the direction of the optical axis of the lenses, a focus position of the optical lens group 1 can be changed.

For the nearsighted persons who use the VR helmet in the embodiments of the present disclosure, images on the display screen 4 can be focused onto their retinas through the optical lens group 1 by adjusting the distance between the optical lens and the display screen 4, such that the nearsighted persons can still view the images on the display screen 4 clearly without wearing glasses. For the farsighted persons who use the VR helmet in the embodiments of the present disclosure, they can also view the images on the display screen 4 clearly without wearing glasses in the same way.

For the same VR helmet in the embodiments, even if it is used by users with different eyesight, the lens distance adjusting module 2 can adjust the distance between the optical lens and the display screen 4 according to the actual diopter of the user's eye to make the focal length of the optical lens group 1 adapted to the diopter of the helmet wearer, thus meeting the use needs of the users with different eyesight.

In FIG. 2, the optical lens group 1 includes two optical lenses. However, in other embodiments of the present disclosure, the optical lens group 1 may include three, four, or more optical lenses. The optical lens group including two optical lenses in FIG. 2 occupies a relatively small space, and thus the overall size of the VR helmet can be reduced.

Referring to FIG. 2, in some embodiments, the first optical lens 11 is a convex lens and the second optical lens 12 is a concave lens, which ensures that the image on the display screen can be converged at the helmet wearer's eyeball side. In some examples, a thickness of the first optical lens 11 is optionally within the range of 1.5-3.5 mm, and a thickness of the second optical lens 12 is optionally within the range of 3-7 mm. Within this range of thickness, the imaging quality of the VR helmet in the embodiments of the present disclosure can be effectively improved. In the case of selecting the optical lens in the optical lens group 1, at least one optical lens may be selected as an aspheric lens to effectively reduce aberration and improve imaging quality.

In the VR helmet in the embodiments of the present disclosure, the distance of each optical lens in the optical lens group 1 relative to the display screen can be adjusted. In view that movement of the first optical lens 11 adjacent to the eyeball may cause discomfort to the helmet wearer, in some examples, the lens distance adjusting module 2 adjusts the distance of the second optical lens 12 relative to the display screen 4 without adjusting the first optical lens 11 fixed relative to the display screen 4. Thus, the discomfort of the helmet wearer upon adjustment of lens distance in front of eyes can be effectively reduce, and the potential damage to the eyes of the helmet wearer due to movement of the first optical lens 11 can be also avoided.

Figure 3:
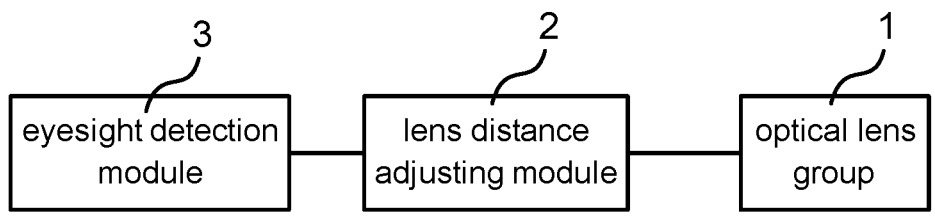
FIG. 3 is a schematic structure view of the VR helmet in other embodiments of the present disclosure.

FIG. 3 shows a schematic structure view of the VR helmet in other embodiments of the present disclosure. In FIG. 3, the VR helmet includes an optical lens group 1, a lens distance adjusting module 2 and an eyesight detection module 3. Compared with the embodiments shown in FIG. 1, these embodiments further comprise an eyesight detection module 3 disposed in a shell 5 of the helmet. The eyesight detection module 3 is configured to detect the eyesight of the helmet wearer to acquire the diopter of the helmet wearer.

After the eyesight detection module 3 acquires the diopter of the helmet wearer, the lens distance adjusting module 2 is configured to automatically adjust the distance of at least one of the optical lenses relative to the display screen 4 along the direction of the optical axis of the lenses according to the diopter, so that the focal length of the optical lens group 1 is adapted to the diopter. This process is performed automatically while the user is wearing the helmet, such that the VR helmet can self-adaptively adjust the focal length after wearing of the helmet wearer to adapt to the diopter of the helmet wearer, thereby enabling the helmet wearer to obtain a clear viewing experience. Further, there is no need for manual adjustment and operation by the helmet wearer, so the VR helmet is also very easy to use.

In some embodiments, the eyesight detection module 3 is implemented by means of the existing eyesight detection instruments. For example, the instruments include a light source, a condenser lens, a slit element and a measurement element (such as a charge-coupled device, etc.) are arranged in front of the eyes of the helmet wearer. The basic principle is that an image projected by the light source is converged onto the slit element through the condenser lens, then enters the eyeball of the helmet wearer through the objective lens, and is finally projected onto the retina; and the image on the retina is reflected onto the measurement element for imaging. If the image projected by the light source is circular-ring shaped, the diopter, astigmatism and angle values are measured based on the shape and size of the circular ring or ellipse imaged on the measurement element.

Human eyes have a certain regulation capacity, which can be represented by a critical distance of clear focusing. The limit distance includes a far-point distance $l_r$ and a near-point distance $l_p$, wherein the far-point refers to the farthest point to which the eyes can see clearly when the muscles of the eyes are completely relaxed, and is denoted by r; and the near-point refers to the closest point to which the eyes can see clearly when the muscles of the eyes are most tensioned, and is denoted by p. The reciprocal value $$\frac{1}{l_r}$$

of the far-point distance $l_r$ denotes a far-point vergence R, and the reciprocal value $$\frac{1}{l_p}$$

of the near-point distance $l_p$ denotes a near-point vergence P, with the unit being diopter (D). An example of a calculation formula for regulation amplitude $\overline{A}$ of the eyes is as follows:

$$\overline{A} = R - P = \frac{1}{l_r} - \frac{1}{l_p}$$

When the eyesight detection module 3 has detected the diopter of the eyes of the helmet wearer, the far-point vergence R (or the near-point vergence P) can be determined, and thereby the corresponding far-point distance $l_r$ (or the near-point distance $l_p$), that is, the target focal length of the optical lens group 1 to be adjusted.

Whether the far-point distance $l_r$ or the near-point distance $l_p$ is selected as the target focal length of the optical lens group 1 mainly depends on whether the helmet wearer is farsighted or nearsighted. For example, if the myopia degree of the helmet wearer is detected to be −2D, the far-point distance that the helmet wearer can see clearly will be $l_r$=½=0.5 m. So it can be derived that the target focal length of the optical lens group 1 as shown in FIG. 2 is 0.5 m. According to the Gaussian formula $$\frac{1}{l'} - \frac{1}{l} = \frac{1}{f'},$$

where l' is an image distance, l is an object distance, and f is a focal length. After the focal length f has been determined to be 0.5 m, if the distance from the first optical lens 11 to eyes is fixed, a specific value of the image distance l' can be determined, and the object distance l can be calculated by putting the specific value of l' into the above Gaussian formula to thereby determine the moving distance of the second optical lens 12. If the distance from the second optical lens 12 to the display screen 4 is fixed, a specific value of the object distance l can be determined, and the image distance l' can be calculated by putting the specific value of l into the above Gaussian formula to thereby determine the moving distance of the first optical lens 11.

Figure 4:
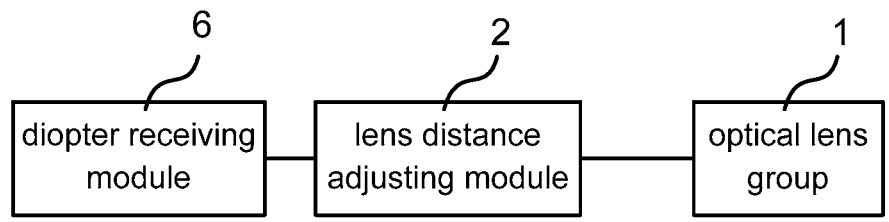
FIG. 4 is a schematic structure view of the VR helmet in further embodiments of the present disclosure.

FIG. 4 shows a schematic structure view of the VR helmet in further embodiments of the present disclosure. In FIG. 4, the VR helmet includes an optical lens group 1, a lens distance adjusting module 2 and a diopter receiving module 6. Compared with the embodiments shown in FIG. 1, these embodiments further comprise a diopter receiving module 6 configured to receive a diopter inputted from the outside. After the diopter receiving module 6 acquires the diopter of the helmet wearer, the lens distance adjusting module 2 is configured to automatically adjust the distance of at least one of the optical lenses relative to the display screen 4 along the direction of the optical axis of the lenses according to the diopter, so that the focal length of the optical lens group 1 is adapted to the diopter.

In some embodiments, the diopter receiving module 6 is implemented by a human-computer interface provided on the VR helmet. In other embodiments, the diopter receiving module 6 is disposed on a control device (e.g. a computer, a smart terminal or the like) that is communicatively connected with the VR helmet in a wired or wireless manner. The user can input the diopter data of his or her own eyesight through the diopter receiving module 6 before wearing of the VR helmet, or input the diopter during wearing. In these embodiments, the VR helmet is enabled to acquire the diopter in a freer manner, out of the limitation that the VR helmet can only perform focal length adjustment to the optical lens group by a wearing action of the user.

In other embodiments of the VR helmet in the present disclosure, the aforementioned eyesight detection module 3 and diopter receiving module 6 may be comprised simultaneously, both of which can provide diopter for the lens distance adjusting module 2 so that the VR helmet is more convenient in use.

FIG. 5 shows a schematic structure view of a left eye lens group and a right eye lens group of the VR helmet in the embodiments of the present disclosure. In FIG. 5, the optical lens group 1 comprises a left eye lens group 1L and a right eye lens group 1R. The left eye lens group 1L comprises an optical lens 11L and an optical lens 12L arranged along the direction of the optical axis of the lenses, and the right eye lens group 1R comprises an optical lens 11R and an optical lens 12R arranged along the direction of the optical axis of the lenses.

In other embodiments, the left eye lens group 1L may comprise three or more optical lenses arranged along the direction of the optical axis of the lenses, and the right eye lens group 1R may also comprise three or more optical lenses arranged along the direction of the optical axis of the lenses. In further embodiments, the optical lens group 1 is not limited to a structural form including the left eye lens group and the right eye lens group, and may also include only a single lens group having a lens width capable of covering two eyes of the helmet user, or include three or more of the lens groups.

In order to enable the helmet wearers having left and right eyes with different eyesight to clearly see the image on the display screen when viewing with the two eyes both, in some embodiments, the lens distance adjusting module 2 individually adjusts the optical lenses in the left eye lens group 1L and the right eye lens group 1R respectively according to different diopters of the left and right eyes. In this way, the use experience and the degree of immersion of the users can be enhanced.

In some other embodiments, the lens distance adjusting module 2 may also synchronously adjust the optical lenses in the left eye lens group 1L and the right eye lens group 1R so as to meet the use experience of the users without a great difference in eyesight of two eyes. In this way, the mechanism of the lens distance adjusting module can be simplified and the size of the VR helmet can be reduced.

FIG. 5 also shows an example of the shell 5 of the helmet and the display screen 4 of the VR helmet. The user can make the eyes approach the optical lens group by wearing the shell 5 of the helmet. In some embodiments, the display screen 4 is internally provided in the shell 5 of the helmet. In other embodiments, the display screen 4 belongs to a display device (for example, a smart terminal such as a smart phone, a tablet computer or the like) installed from the outside.

Figure 6:
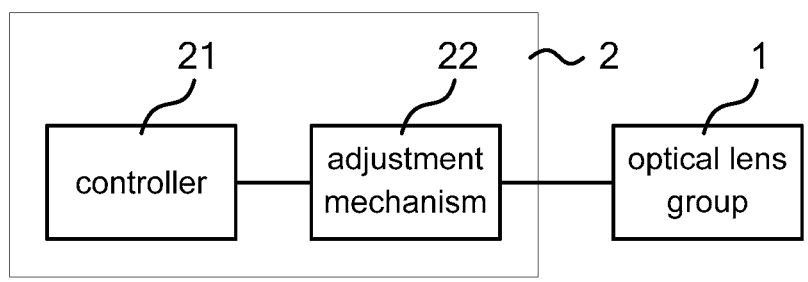
FIG. 6 is a schematic structure view of the VR helmet in yet other embodiments of the present disclosure.

FIG. 6 shows a schematic structure view of the VR helmet in further embodiments of the present disclosure. In FIG. 6, the lens distance adjusting module 2 specifically includes a controller 21 and an adjustment mechanism 22. The controller 21 is configured to acquire the diopter of the helmet wearer and calculate a corresponding lens adjustment parameter. The adjustment mechanism 22 can adjust the distance of the optical lens relative to the display screen 4 along the direction of the optical axis of the lenses based on the lens adjustment parameter from the controller 21.

In some embodiments, the controller 21 is arranged inside the VR helmet, or in a control device (e.g. a computer, a smart terminal or the like) that is in communication with the VR helmet in a wired or wireless manner. The adjustment mechanism 22 is disposed in the shell 5 of the VR helmet.

In other embodiments of the present disclosure, the specific structure of the lens distance adjusting module 2 shown in FIG. 6 is also applicable to the VR helmet in the foregoing embodiments as shown in FIG. 3 and FIG. 4. Correspondingly, the controller 21 is configured to receive the diopter data from the eyesight detection module 3 and/or the diopter receiving module 6.

Figure 7:
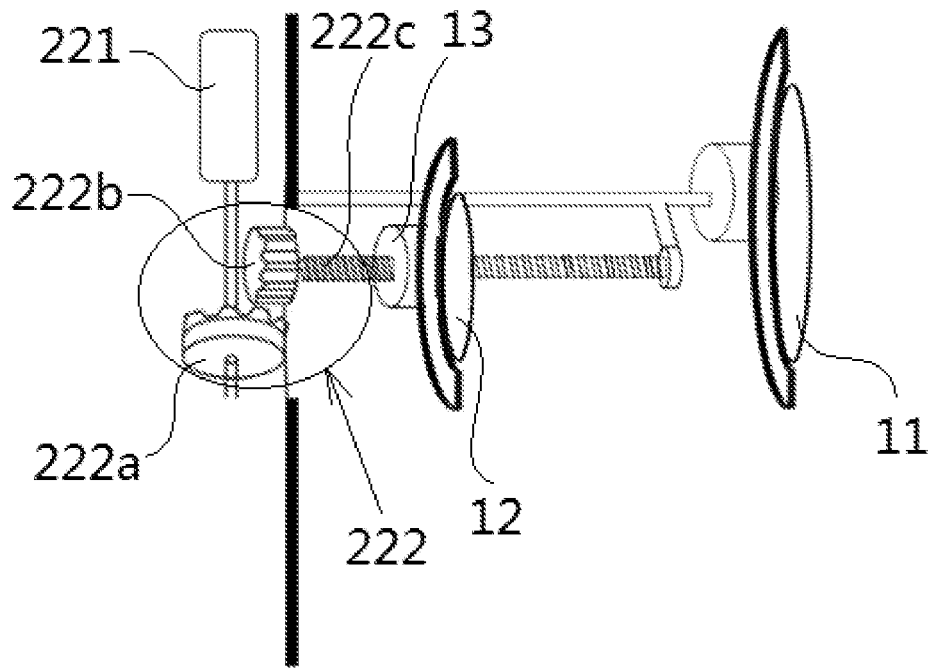
FIG. 7 is a schematic structure view of an adjustment mechanism of the VR helmet in the embodiments of the present disclosure.

FIG. 7 shows a schematic structure view of the adjustment mechanism of the VR helmet in the embodiments of the present disclosure. In FIG. 7, the adjustment mechanism 22 comprises a power mechanism 221 and a transmission mechanism 222. The power mechanism 221 is configured to output power according to the lens adjustment parameter calculated by the controller 21. The power mechanism 221 optionally includes a servo motor or a stepping motor, which can achieve more precise lens distance adjustment based on the direction and amplitude of rotation corresponding to the lens adjustment parameter. In other embodiments, the power mechanism 221 may also optionally include a pneumatic device or a hydraulic device.

The transmission mechanism 222 is disposed between the power mechanism 221 and a lens holder 13 on which the optical lens is mounted, so as to transmit the power outputted from the power mechanism 221 to the lens holder 13 to move the lens holder 13 along the direction of the optical axis of the lenses. The transmission mechanism 222 in the embodiments includes a gear set and a lead screw 222c. The power mechanism 221 drives the lead screw 222c to rotate through the transmission action of the gear set.

The gear set and the lead screw 222c both adopt a meshing manner for transmission. Therefore, the transmission precision and sensitivity are relatively high, and accordingly the lens distance adjustment can be effectively improved in precision.

Referring to the embodiments as shown in FIG. 7, the lens holder 13 is fitted over and in threaded engagement with the lead screw 222c. The lens holder 13 is linearly movable along the rotation axis of the lead screw 222c with the rotation of the lead screw 222c. The first optical lens 11 is mounted on a relatively fixed bracket, while the second optical lens 12 is mounted on the lens holder 13. An output shaft of the power mechanism 221 is perpendicular to the rotation axis of the lead screw 222c, and the gear set includes a first gear 222a and a second gear 222b. The first gear 222a is mounted on the output shaft of the power mechanism 221. The second gear 222b is fixedly connected to the lead screw 222c and engaged with the first gear, wherein a rotation axis of the second gear 222b coincides with the rotation axis of the lead screw 222c.

In this way, when the output shaft of the power mechanism 221 rotates by a preset angle, the first gear 222a is driven to rotate synchronously, and the second gear 222b in meshing engagement with the first gear 222a is rotated in a vertical direction therewith and drives the lead screw 222c to rotate. Rotation of the lead screw 222c may drive the lens holder 13 in threaded engagement with the lead screw 222c to linearly move, thereby effectuating adjustment of the distance of the second optical lens 12 on the lens holder 13 relative to the display screen along the direction of the optical axis of the lenses. In the embodiments, the output shaft of the power mechanism 221 is arranged perpendicular to the rotation axis of the lead screw 222c, which can effectively reduce the occupation space of the adjustment mechanism, and thereby reduce the size of the VR helmet.

Figure 8:
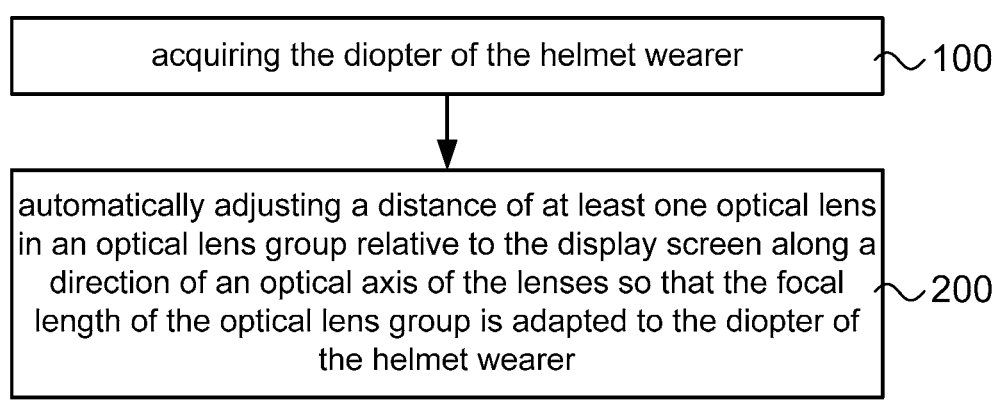
FIG. 8 is a schematic flow chart of a control method in some embodiments of the present disclosure.

FIG. 8 shows a schematic flow chart of a control method in some embodiments of the present disclosure. In FIG. 8, the control method based on the VR helmet in the foregoing embodiments comprises: Step 100, acquiring the diopter of the helmet wearer; Step 200, automatically adjusting a distance of at least one optical lens in an optical lens group 1 relative to the display screen along a direction of an optical axis of the lens so that the focal length of the optical lens group 1 is adapted to the diopter of the helmet wearer.

According to the embodiments of the present disclosure, the focal length of the optical lens group can be automatically adjusted to adapt to the diopter of the helmet wearer by automatically adjusting the distance of the optical lens relative to the display screen along the direction of the optical axis of the lens, so that the helmet wearers with different eyesight can view the display screen more clearly, effectively improving the use experiences of the helmet wearers with different eyesight.

Figure 9:
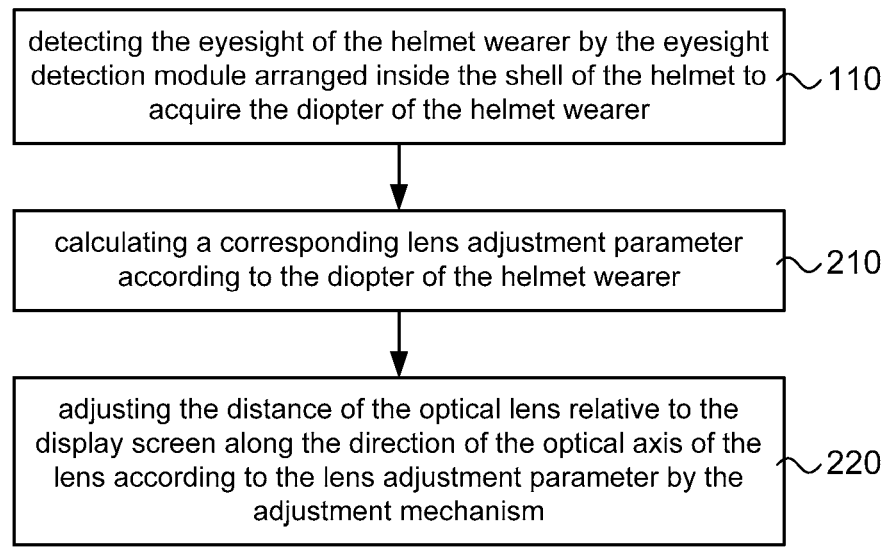
FIG. 9 is a schematic flow chart of the control method in other embodiments of the present disclosure.

FIG. 9 is a schematic flow chart of the control method in other embodiments of the present disclosure. In FIG. 9, Step 100 in the present embodiments includes: Step 110, detecting the eyesight of the helmet wearer by the eyesight detection module 3 arranged inside the shell of the helmet to acquire the diopter of the helmet wearer.

In the present embodiments, the eyesight detection module can detect the eyesight of the user who wears the VR helmet. This process can be performed automatically when the user is wearing the VR helmet so that the helmet wearer can obtain a clear viewing experience. Further, there is no need for manual adjustment and operation by the helmet wearer, so the VR helmet is also very easy to use. For the implementation and description of the function of the eyesight detection module, reference may be made to the embodiments in FIG. 3.

When the diopter of the helmet wearer is acquired in Step 110, in some embodiments, Step 200 includes: Step 210, calculating a corresponding lens adjustment parameter according to the diopter of the helmet wearer; Step 220, adjusting the distance of the optical lens relative to the display screen along the direction of the optical axis of the lens according to the lens adjustment parameter by the adjustment mechanism 22.

Step 210 and Step 220 may be executed by the controller 21 and the adjustment mechanism 22 respectively with reference to the embodiments in FIG. 6. For details, reference may be made to the embodiments in FIG. 6.

Figure 10:
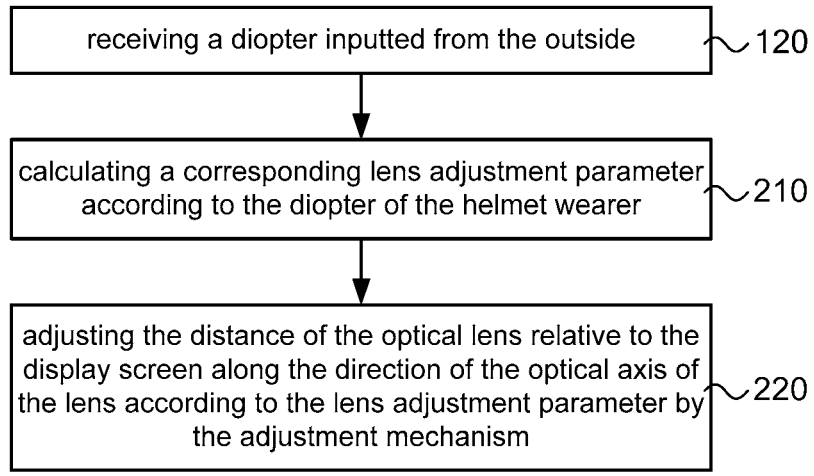
FIG. 10 is a schematic flow chart of the control method in further embodiments of the present disclosure.

FIG. 10 is a schematic flow chart of the control method in further embodiments of the present disclosure. In FIG. 10, Step 100 in the present embodiments includes: Step 120, receiving a diopter inputted from the outside.

In the present embodiment, the user can input the diopter data of his or her own eyesight through the diopter receiving module before wearing of the VR helmet, or input the diopter during wearing. After the diopter receiving module receives the diopter, the controller can receive the diopter from the diopter receiving module and execute the aforementioned Step 210 and Step 220. In the embodiments, the VR helmet is enabled to obtain the diopter in a freer manner, without the limitation that the VR helmet can only perform focal length adjustment to the optical lens group by a wearing action of the user.

Figure 11:
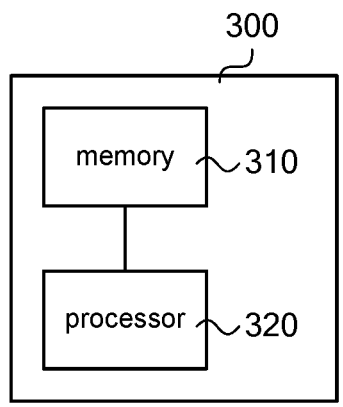
FIG. 11 is a schematic structure view of the VR helmet in some embodiments of the present disclosure.

FIG. 11 is a schematic structure view of the VR helmet in some embodiments of the present disclosure. Referring to FIG. 11, the apparatus 300 in these embodiments includes a memory 310 and a processor 320 coupled to the memory 310. The processor 320 is configured to execute the control method as described in any one of the foregoing embodiments based on instructions stored in the memory 310.

The memory 310 may include, for example, a system memory, a fixed non-volatile storage medium, or the like. The system memory is stored with, for example, an operating system, an application program, a boot loader, and other programs.

Also provided in embodiments of the present disclosure is a computer readable storage medium stored thereon with a computer program which, when executed by the processor, implements any one of the aforementioned control method.

One skilled in the art should understand that, the embodiments of the control method of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more of the computer-usable non-transitory storage media (including, but not limited to, disk memory, CD-ROMs, optical memory and the like) containing computer-usable program code.

The present disclosure is described with reference to flow charts and/or block diagrams of a method, a device (system), and a computer program product according to embodiments of the present invention. It is to be understood that each flow and/or block in the flow charts and/or block diagrams, and combinations of the flows and/or blocks in the flow charts and/or block diagrams, may be implemented by computer program instructions. These computer program instructions may be provided to a processor of a general purpose computer, a special purpose computer, an embedded processing machine or other programmable data processing apparatuses to produce a machine, such that the instructions executed by the processor of the computer or other programmable data processing apparatuses produce an apparatus for implementing a specified function in one or more flows in the flow charts and/or one or more blocks in the block diagrams.

These computer program instructions may also be stored in a computer readable memory that can direct the computer or other programmable data processing apparatuses to operate in a particular manner, such that the instructions stored in the computer readable memory produce an article of manufacture including instruction means that implement specified functions in one or more flows in the flow charts and/or one or more blocks in the block diagrams.

These computer program instructions may also be loaded onto the computer or other programmable data processing apparatuses to cause a series of operating steps to be performed on the computer or other programmable apparatuses to produce computer-implemented processes, such that the instructions executed on the computer or other programmable apparatuses provide steps for implementing specified functions in one or more flows in the flow charts and/or one or more blocks in the block diagrams.

Finally, it should be explained that the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit of the present disclosure, they should all be covered in the scope of the technical solution for which protection is sought in the present disclosure.

What is claimed is:

1. A virtual reality helmet, comprising:
    a display screen;
    an optical lens group comprising lenses that comprise at least two optical lenses arranged along a direction of an optical axis of the lenses; and
    a lens distance adjusting module configured to automatically adjust a distance of at least one of the lenses relative to the display screen along the direction of the optical axis of the lenses so that a focal length of the optical lens group is adapted to a diopter of a helmet wearer,
    wherein the optical lens group is located between the display screen and the helmet wearer's eyeball, the optical lens group comprises a first optical lens near the helmet wearer's eyeball side and a second optical lens near the display screen side, the first optical lens being a convex lens, the second optical lens being a concave lens, the first optical lens is fixed relative to the display screen, and the lens distance adjusting module is configured to adjust the distance of the second optical lens relative to the display screen.

2. The virtual reality helmet according to claim 1, further comprising: an eyesight detection module arranged inside a shell of the virtual reality helmet and configured to detect eyesight of the helmet wearer to acquire the diopter of the helmet wearer.

3. The virtual reality helmet according to claim 1, further comprising: a diopter receiving module configured to receive a diopter inputted from the outside.

4. The virtual reality helmet according to claim 1, wherein the lens distance adjusting module comprises:
    a controller configured to acquire the diopter of the helmet wearer and calculate a lens adjustment parameter; and
    an adjustment mechanism configured to adjust the distance of the at least one of the lenses relative to the display screen along the direction of the optical axis of the lenses according to the lens adjustment parameter from the controller.

5. The virtual reality helmet according to claim 4, wherein the adjustment mechanism comprises:
    a power mechanism configured to output power according to the lens adjustment parameter, and
    a transmission mechanism disposed between the power mechanism and a lens holder on which the at least one of the lenses is mounted, the transmission mechanism being configured to transmit the power outputted from the power mechanism to the lens holder to move the lens holder along the direction of the optical axis of the lenses.

6. The virtual reality helmet according to claim 5, wherein the power mechanism comprises a servo motor or a stepping motor.

7. The virtual reality helmet according to claim 5, wherein the transmission mechanism comprises a gear set and a lead screw, and the power mechanism drives the lead screw to rotate through transmission action of the gear set.

8. The virtual reality helmet according to claim 7, wherein
an output shaft of the power mechanism is perpendicular to a rotation axis of the lead screw, and
the gear set comprises a first gear mounted on the output shaft of the power mechanism and a second gear, which is fixedly connected to the lead screw and engaged with the first gear, wherein a rotation axis of the second gear coincides with the rotation axis of the lead screw.

9. The virtual reality helmet according to claim 1, wherein at least one of the lenses is an aspheric lens.

10. The virtual reality helmet according to claim 1, wherein
the optical lens group comprises a left eye lens group and a right eye lens group, each comprising at least two optical lenses arranged along the direction of the optical axis of the at least two optical lenses;
the lens distance adjusting module is configured to individually adjust one or more of the at least two optical lenses of the left eye lens group and one or more of the at least two optical lenses of the right eye lens group respectively.

11. The virtual reality helmet according to claim 1, wherein
the optical lens group comprises a left eye lens group and a right eye lens group, each comprising at least two optical lenses arranged along the direction of the optical axis of the at least two optical lenses;
the lens distance adjusting module is configured to synchronously adjust one or more of the at least two optical lenses of the left eye lens group and one or more of the at least two optical lenses of the right eye lens group.

12. The virtual reality helmet according to claim 1, wherein a thickness of the first optical lens ranges from 1.5 mm to 3.5 mm, and a thickness of the second optical lens ranges from 3 mm to 7 mm.

13. A control method based on the virtual reality helmet according to claim 1, comprising:
acquiring the diopter of the helmet wearer;
automatically adjusting a distance of at least one of the lenses in the optical lens group relative to the display screen along a direction of an optical axis of the lenses, so that the focal length of the optical lens group is adapted to the diopter of the helmet wearer.

14. The control method according to claim 13, wherein the acquiring comprises:
detecting eyesight of the helmet wearer by eyesight detection module arranged inside a shell of the virtual reality helmet to acquire the diopter of the helmet wearer.

15. The control method according to claim 13, wherein the acquiring comprises:
receiving a diopter inputted from the outside.

16. The control method according to claim 13, wherein the adjusting comprises:
calculating a lens adjustment parameter according to the diopter of the helmet wearer;
according to the lens adjustment parameter, adjusting the distance of the at least one of the lenses relative to the display screen along the direction of the optical axis of the lenses by an adjustment mechanism.

17. A virtual reality helmet comprising:
a memory; and
a processor coupled to the memory, the processor being configured to execute the control method according to claim 13 based on instructions stored in the memory.

18. A non-transitory computer readable storage medium storing a computer program which, when executed by a processor, implements the control method according to claim 13.

* * * * *